US008972376B1

(12) United States Patent
Gailis et al.

(10) Patent No.: US 8,972,376 B1
(45) Date of Patent: Mar. 3, 2015

(54) OPTIMIZED WEB DOMAINS CLASSIFICATION BASED ON PROGRESSIVE CRAWLING WITH CLUSTERING

(71) Applicant: Palo Alto Networks, Inc., Santa Clara, CA (US)

(72) Inventors: Renars Gailis, Santa Clara, CA (US); Lin Xu, San Jose, CA (US); Renzo Lazzarato, Pleasanton, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 92 days.

(21) Appl. No.: 13/732,860

(22) Filed: Jan. 2, 2013

(51) Int. Cl.
G06F 17/30 (2006.01)

(52) U.S. Cl.
CPC .............................. G06F 17/30864 (2013.01)
USPC ........... 707/710; 707/706; 707/722; 707/736; 707/758; 706/12; 706/14

(58) Field of Classification Search
None
See application file for complete search history.

(56) References Cited

U.S. PATENT DOCUMENTS

| 7,849,093 | B2* | 12/2010 | Farago et al. | 707/755 |
| 8,069,182 | B2* | 11/2011 | Pieper | 707/769 |
| 2008/0010291 | A1* | 1/2008 | Poola et al. | 707/10 |
| 2008/0104113 | A1* | 5/2008 | Wong et al. | 707/104.1 |
| 2008/0275902 | A1* | 11/2008 | Burges et al. | 707/102 |
| 2008/0320010 | A1* | 12/2008 | Li et al. | 707/100 |
| 2009/0050712 | A1* | 2/2009 | Vitantonio et al. | 239/332 |
| 2009/0070366 | A1* | 3/2009 | Zhao et al. | 707/102 |

* cited by examiner

Primary Examiner — Hung Le
(74) Attorney, Agent, or Firm — Van Pelt, Yi & James LLP

(57) ABSTRACT

Techniques for optimized web domains classification based on progressive crawling with clustering are disclosed. In some embodiments, optimized web domains classification based on progressive crawling with clustering includes crawling a domain (e.g., a web site domain) to collect data for a subset of pages (e.g., web pages) of a corpus of content associated with the domain; classifying each of the crawled pages into one or more category clusters, in which the category clusters represent a content categorization of the corpus of content associated with the domain (e.g., a URL content categorization for the domain, host of that domain, and/or directory of that domain); and determining which of the one or more category clusters to publish for the domain.

25 Claims, 8 Drawing Sheets

2nd DB Published Contains an Entry for the zzz.foo.com Cluster

US 8,972,376 B1

OPTIMIZED WEB DOMAINS CLASSIFICATION BASED ON PROGRESSIVE CRAWLING WITH CLUSTERING

BACKGROUND OF THE INVENTION

A web crawler is an executable computer program that typically browses the World Wide Web (e.g., the web) in a methodical, automated manner or in an orderly manner. Web crawlers are also sometimes referred to as ants, automatic indexers, crawlers, web robots or bots, web spiders or spiders, or web scutters.

A web crawler generally performs a process that is known as web crawling or spidering. A web crawler is a type of bot, or software agent. In general, a web crawler starts with a list of Uniform Resource Locator addresses ("URLs") to visit, called the seeds. As the web crawler visits these URLs, the crawler attempts to identify all the hyperlinks in the web page and adds the identified hyperlinks to the list of URLs to visit, called the crawl frontier. URLs from the crawl frontier can be recursively visited according to a set of policies.

Web crawlers are commonly used by search engines that attempt to index the entire or a vast majority of the searchable/publicly accessible sites and web pages available on the World Wide Web. Web crawlers are primarily used to create a copy of all the visited pages for later processing by a search engine that can index the downloaded pages to provide fast searches. For example, search engines (e.g., Google's search engine, Yahoo's search engine, and/or other search engines) can use web crawlers to index web sites for providing up-to-date searchable index data for World Wide Web searches performed using the search engine.

BRIEF DESCRIPTION OF THE DRAWINGS

Various embodiments of the invention are disclosed in the following detailed description and the accompanying drawings.

DETAILED DESCRIPTION

Figure 1:
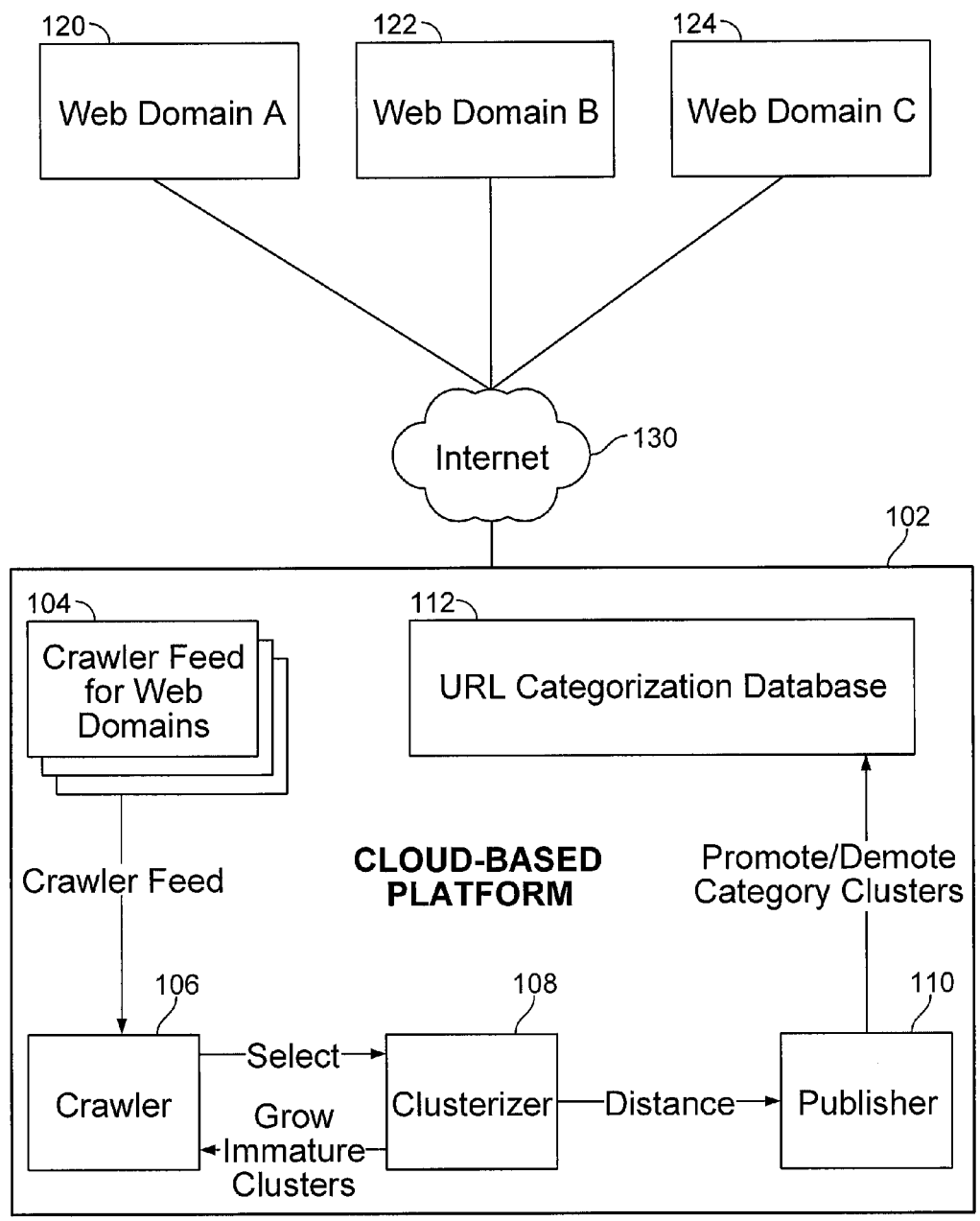
FIG. 1 is a functional diagram illustrating an architecture for optimized web domains classification based on progressive crawling with clustering in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A web crawler is an executable computer program that typically browses the World Wide Web (e.g., the web) in a methodical, automated manner or in an orderly manner. Web crawlers are also sometimes referred to as ants, automatic indexers, crawlers, web robots or bots, web spiders or spiders, or web scutters.

A web crawler generally performs a process that is known as web crawling or spidering. A web crawler is a type of bot, or software agent. In general, a web crawler starts with a list of Uniform Resource Locator addresses ("URLs") to visit, called the seeds. As the web crawler visits these URLs, the crawler attempts to identify all the hyperlinks in the web page and adds the identified hyperlinks to the list of URLs to visit, called the crawl frontier. URLs from the crawl frontier can be recursively visited according to a set of policies.

Web crawlers are commonly used by search engines that attempt to index the entire or a vast majority of the searchable/publicly accessible sites and web pages available on the World Wide Web. Web crawlers are primarily used to create a copy of all the visited pages for later processing by a search engine that can index the downloaded pages to provide fast searches. For example, search engines (e.g., Google's search engine, Yahoo's search engine, and/or other search engines) can use web crawlers to index web sites for providing up-to-date searchable index data for World Wide Web searches performed using the search engine.

Security products, such as firewalls and/or integrated security devices (e.g., security appliances that include firewall engines), generally classify web domains (e.g., uniquely identified by URLs, such as foo.com) for performing URL filtering and/or other security related functions or implement security related policies based on URL filtering or URL categorization/classification related information. For example, commonly visited web domains can be classified, such as for web sites like YouTube, Wikipedia, Google, Facebook, and other web sites. In some cases, some of the URLs can be classified manually. In some cases, some of the URLs can be classified using computer implemented algorithms.

In particular, URL filtering can be a significant functionality of a security device (e.g., a firewall, integrated security appliance, security gateway, router, and/or other network/security related device). In URL filtering, a URL is generally associated with one or more categories (e.g., sports, games, news, social networking, jobs, questionable, and/or other categories). The URL categorization data sets are typically stored in a URL categorization data store (e.g., a URL categorization database). For example, a security device, such as a security appliance or a proxy that includes a firewall engine, can use the information stored in the URL data store to enforce URL filtering policies related to web browsing. Such URL filtering policies can be defined in terms of the URL categories (e.g., BLOCK questionable; ALLOW and LOG games, jobs, social networking, and sports; ALLOW and DO NOT LOG news, and/or various other filtering policies can be defined and applied). For each URL that the user(s) attempt to access, the security device can look-up the URL to determine the corresponding categories (if any) in the URL categorization database, and then the security device can apply the policies (if any) defined for such matching categories (e.g., BLOCK, ALLOW, LOG, ALERT, and/or various other filtering policies).

However, with a typically large number of URL categories (e.g., hundreds of categories or more, such as categories including search, games, news, shopping, sports, blog, social networking, questionable, and various other categories) and an ever increasing number of web domains (e.g., millions of web domains with increasing amounts of content and complexity) in many different languages (e.g., 50-100 or more different languages are commonly used on the World Wide Web), providing an accurate, current, and comprehensive classification of URLs for the World Wide Web presents a challenging, complex, and constantly changing task.

The creation of a URL categorization database generally requires the crawling and categorization of web domains on the World Wide Web. Assuming a defined and limited set of categories (e.g., 100 or more different categories), classification requires performing a process for accurately and reliably associating one or more of the categories to each web domain. A web domain can be categorized at a domain level (e.g., foobar.com), at a host level (e.g., host1.foobar.com), at a path/directory level (e.g., host1.foobar.com/dir1/dir2/ . . . /dirN), and/or at the file level (e.g., host1.foobar.com/dir1/dir2/ . . . /dirN/fileA.html). For example, crawling and categorizing web content on the World Wide Web can, thus, involve crawling hundreds of millions of web domains and hundreds of billions of web pages.

Various commercial vendors have developed URL classification data sets for the World Wide Web over a period of many years utilizing a combination of human inspection techniques and proprietary classification software techniques to categorize and maintain URLs to facilitate URL filtering to protect against today's targeted and advanced security threats. Moreover, such URL classification data sets can also be continually updated (e.g., typically using a team of global researchers around the globe) as the World Wide Web and threats are constantly changing and evolving. Certain of these commercial vendors provide their URL classification data sets to customers as a subscription service. Example commercial vendors that provide such commercially available URL classification data sets as a subscription service include WebSense, Zscaler, and others.

However, such commercially available URL classification data sets provided by commercial vendors as a subscription service are typically provided as a standard set to all customers. For example, a customer in Asia would generally receive the same URL classification data sets as a customer in Europe, even though such may have different common URLs that are visited by their respective users. As another example, a customer that is a United States social web site company would likely have different URLs that are visited by their employees than another customer that is a governmental entity that is based in South America and, thus, sending identical URL classification data sets to such different customers is not an efficient or targeted mechanism for the clearly different URL classification needs of these different customers.

Also, such a URL classification data set is typically delivered by these commercial vendors as an encrypted URL classification data set. In particular, using such an encrypted URL classification data set requires a more expensive URL look-up (e.g., in terms of computing and time costs for such URL look-ups using the encrypted URL classification data set). For example, to perform a URL categorization look-up, a hash (e.g., MD5 hash or another hashing algorithm) is performed for each URL path (e.g., initially using the full URL path, such as foo.com/Dir-1/Dir-2/ . . . /Dir-N−1/Dir-N) and then a look-up is performed using that hashed URL path to attempt to identify a match in the encrypted URL classification data set. If there is no match, then a shortened version of the URL can be used (e.g., a shorted version of the URL path, such as foo.com/Dir-1/Dir-2/ . . . /Dir-N−1) to repeat this process, and so forth (e.g., up to foo.com if necessary), until there is a match or it is determined that no match exists for this URL in the encrypted URL classification data set. As a result, this process can require an expensive and time consuming look-up using the encrypted URL classification data set as such can potentially require several hashing operations and look-up operations for every URL match attempt (e.g., as the process necessitates attempting the look-up using the full URL path to ensure an accurate URL based category look-up match is determined). For example, this approach is particularly undesirable for high speed security devices, such as an integrated security appliance that is designed to handle a significant volume of user/device related network traffic.

Also, existing manual classification approaches are inefficient and/or impractical given the size of the Internet—World Wide Web. Given the number of web domains and number of web pages, extensively crawling each web domain by crawling all web pages of the web domain is a time and resource intensive approach, which is an expensive effort in terms of time and physical resources (e.g., computing power and network bandwidth) used by major search engines that have a need to attempt to exhaustively index the entire Internet—World Wide Web. Moreover, crawling web domains by looking to a small subset of web pages, such as selecting such subset of web pages pseudo randomly, is an approach that is subject to a risk of an inaccurate categorization by missing a cluster of pages with different categories. For example, foobar.com could be categorized as an "Internet Portal", and the approach would miss the fact that web pages at host1.foobar.com/dir1/dir2/dir3 belong to another category, such as Gambling.

What are needed are improved techniques for providing URL classification data sets for security applications. In particular, techniques for optimizing the crawling and categorizing of web content are needed to provide reliable categorization of web domains (e.g., which can be performed at the domain level, host level, directory level, and/or file level). Also, techniques for providing a cloud service that can deliver such improved URL classification data to security devices, in which such URL classification data can be optimized for the network traffic monitored by such security devices, are needed.

Accordingly, various techniques for optimized web domains classification based on progressive crawling with clustering are disclosed. For example, using the various techniques described herein, optimized web domains classification based on progressive crawling with clustering includes discovering and classifying each web domain at a different level (e.g., at the domain level, host level, directory level, and/or file level) by incrementally crawling only those web pages needed to accurately identify a category cluster of web pages associated with the same URL category and to focus the crawling of additional pages in such a way so as to facilitate discover any potentially new, different category clusters.

In some embodiments, optimized web domains classification based on progressive crawling with clustering includes crawling a domain (e.g., a web site domain, also referred to herein as web domain, such as foo.com) to collect data for a subset of pages (e.g., web pages) of a corpus of content associated with the domain; classifying each of the crawled pages into one or more category clusters, in which the category clusters represent a content categorization of the corpus of content associated with the domain (e.g., a URL content categorization for the domain, host of that domain, and/or path/directory of that domain); and determining which of the one or more category clusters to publish for the domain.

In some embodiments, optimized web domains classification based on progressive crawling with clustering includes determining a sub-entry point to randomly select as a next web page to crawl of the subset of web pages (e.g., implementing a selection algorithm that uses a knowledge base to decide which entry points to crawl to put into an input queue for a spider, in which the knowledge base can include past crawling data, a popularity score based on requests from firewalls/security devices and a number of requests per firewall/security device, in which the spider can crawl up to a predetermined number of pages, number of usable bytes, number of usable for each entry point, and/or based on other criteria).

In some embodiments, classifying each of the crawled pages into one or more category clusters includes associating each of the crawled pages with a URL content categorization (e.g., sports, news, games, jobs, questionable, or other categories).

In some embodiments, optimized web domains classification based on progressive crawling with clustering further includes promoting a category cluster to a primary category cluster for the domain.

In some embodiments, optimized web domains classification based on progressive crawling with clustering further includes demoting a primary category cluster to a secondary category cluster for the domain.

In some embodiments, optimized web domains classification based on progressive crawling with clustering further includes determining which of the one or more clusters to promote into a primary category cluster or a secondary category cluster, or to demote (e.g., using one or more heuristics to determine a confidence level, including using a rate of cluster size growth).

In some embodiments, optimized web domains classification based on progressive crawling with clustering further includes performing domain classification at a domain level (e.g., a web site domain, such as foo.com), a host level (e.g., a host of a web site domain, such as host-1.foo.com), a path level (e.g., a directory level, such as host-1.foo.com/Dir-1/ Dir-2/ . . . /Dir-N), and/or a file level (e.g., a web page, such as host-1.foo.com/Dir-1/Dir-2/ . . . /Dir-N/WebPage.HTML).

In some embodiments, optimized web domains classification based on progressive crawling with clustering further includes classifying content based on requests for content received from one or more of a plurality of security devices (e.g., firewalls, integrated security appliances, security gateways, routers, and/or other network/security devices).

In some embodiments, optimized web domains classification based on progressive crawling with clustering further includes determining to promote a main/primary cluster (e.g., facebook.com is a social cluster; and a primary cluster for the linkedin.com web domain is a social cluster, and a secondary cluster for the linkedin.com/jobs sub-domain (path within that domain) is a jobs cluster).

In some embodiments, optimized web domains classification based on progressive crawling with clustering further includes a classifier (e.g., implemented using a Bayes based classifier, logistic regression techniques, and/or other machine based learning classification and/or machine automated classification techniques) to classify a web page based on data associated with the web page (e.g., textual content, non-textual content, HTML structure of the web page, URL (s) referring the web page, URL(s) referenced in the web page, host name and/or domain name hosting the web page, etc.).

In some embodiments, optimized web domains classification based on progressive crawling with clustering further includes identifying a plurality of paths (e.g., a.foo.com and b.foo.com) associated with a host or domain based on, for example, DNS records, logs, etc.

In some embodiments, optimized web domains classification based on progressive crawling with clustering further includes classifying based on a domain level, a host level, a path level, and/or a file level.

In some embodiments, optimized web domains classification based on progressive crawling with clustering further includes setting an expiration period (e.g., 30 minutes, a number of hours, a number of days, a number of weeks, and/or some other interval(s)) for a classification of a single entry (e.g., automatic refresh/recrawl and classify, such as to increase expiration period over time, such as if fewer changes are observed over time).

In some embodiments, optimized web domains classification based on progressive crawling with clustering further includes performing an action (e.g., allow, block, alert, log, and/or various other action(s)) based on the URL categorization of a web page.

In some embodiments, optimized web domains classification based on progressive crawling with clustering further includes associating a popularity score (e.g., a number of firewalls/security devices and number of requests per firewall/security device). In some embodiments, the popularity score is related to the number of the look-ups that occur in the cloud for a particular domain as well as some external information of the domain, such as its rank based on various tools for ranking popularity of domains (e.g., such as based on Alexa, which ranks domains based on tracking information of users using the Alexa toolbar that is available for various web browsers or as extensions to various web browsers). For example, the popularity score can be used as a gauge for measuring whether there are a lot of visits in the Internet for a particular domain. In some embodiments, the relatively more popular domains are classified or re-classified, which can provide a more efficient approach by focusing the classification and re-classification resources on such popular domains on the Internet. As another example, the popularity score can also be used when analyzing a URL database's precision in order to achieve a higher precision on the more popular web domains.

In some embodiments, optimized web domains classification based on progressive crawling with clustering further includes determining a cluster is complete/mature (e.g., based on a threshold, such as a number of pages, such as 100 pages, and/or size of usable data, such as 50 kilobytes (kb)).

In some embodiments, optimized web domains classification based on progressive crawling with clustering further includes growing non-mature/incomplete clusters.

In some embodiments, optimized web domains classification based on progressive crawling with clustering further includes re-clustering periodically (e.g., after expiration, new requests, and/or some other criteria).

In some embodiments, techniques for providing optimized web domains classification based on progressive crawling are implemented as a cloud service that provides URL categorization to security devices and/or security hardware/software solutions, such as enterprise firewalls, integrated security solutions that provide network content filtering, including network device based (e.g., security appliance, router, gateway, and/or other network devices), host security software, and client security software related solutions. In some embodiments, a cloud service for providing optimized web domains classification based on progressive crawling with clustering includes distributing a first URL content categorization data feed to a first plurality of subscribers, in which the first URL content categorization data feed is collected using an optimized web domains classification based on progressive crawling with clustering to determine which category clusters to publish for each categorized web domain; and distributing a second URL content categorization data feed to a second plurality of subscribers, in which the second URL content categorization data feed is collected using an optimized web domains classification based on progressive crawling with clustering to determine which category clusters to publish for each categorized web domain. In some embodiments, the first plurality of subscribers are associated with a first geography and/or language, and the second plurality of subscribers are associated with a second geography and/or language. For example, such a cloud service can provide a URL categorization seed database by region (e.g., Latin America, Asia, Europe, Americas, etc.).

In some embodiments, the cloud service can also batch requests from one or more security devices for unknown URL requests for processing by a URL classifier; receive in return the determined URL classifications (e.g., including all of the relatives, such as parents and siblings, etc.); and then send the updated/new URL classifications to the requesting security devices, which can cache or store the updated/new URL classifications. As a result, over time, the URL classifications data can be optimized for each customer (e.g., as a United States based bank customer's security devices will typically intercept different domain content requests than would a United States based law firm customer's security devices).

In some embodiments, the cloud service for providing optimized web domains classification based on progressive crawling with clustering further includes receiving a request to classify content for a first web domain from a first security device (e.g., a firewall/security device, such as an integrated security appliance that performs URL filtering and/or other firewall related functions that apply security policies based on URL categorization data); automatically classifying the content for the first web domain; sending the classification for the content for the first web domain to the first security device; receiving a request to classify content for a second web domain from a second security device; automatically classifying the content for the second web domain; and sending the classification for the content for the second web domain to the second security device. For example, using such techniques, the first security device can store different URL categorization data sets over time than the second security device (e.g., even if the initial URL categorization data sets provided to each security device were identical) based on different URL requests passing through first security device over time that would trigger different new URL content categorization requests being sent to and then received from the cloud service, in which the URL categorization data sets stored on the first security device are thereby optimized for the first security device.

FIG. 1 is a functional diagram illustrating an architecture for optimized web domains classification based on progressive crawling with clustering in accordance with some embodiments. As shown, a cloud-based platform 102 for providing optimized web domains classification based on progressive crawling with clustering is in communication with the Internet 130 and various web domains, including Web Domain A 120, Web Domain B 122, and Web Domain C 124. For example, the cloud-based platform 102 for providing optimized web domains classification based on progressive crawling with clustering can discover and classify each web domain at different levels (e.g., domain level, host level, directory/path level, and/or file level) by incrementally crawling a subset of web pages sufficient to identify a cluster of web pages associated to the same category and to focus the crawling of additional pages in such a way to discover new clusters.

As an example, assume that a set of URL categories for URL classification includes a set of N predefined categories. In some embodiments, various techniques are applied to classify a web page (e.g., to compute the probability that a web page belongs to a particular category based on data associated with the web page, such as web page textual and non-textual content, the HTML structure of the web page, URL referring the web pages (incoming links) as well as URL referenced in the web page (outgoing links), and/or other data publicly available related to the web pages, the host name and the domain name of the servers hosting the page, etc.). In some embodiments, a probability is measured as a score value and a confidence level value associated with the classification for a particular category.

In some embodiments, the cloud-based platform 102 includes the following engines, as shown in FIG. 1: a crawler 106; a clusterizer 108; and a publisher 110. In some embodiments, the crawler is implemented to discover web pages as well as to extract the content of the web pages present in a web domain. In some embodiments, optimized web domains classification based on progressive crawling with clustering includes determining a sub-entry point to randomly select as a next web page to crawl of the subset of web pages (e.g., implementing a selection algorithm that uses a knowledge base to decide which entry points to crawl to put into an input queue for a spider, in which the knowledge base can include past crawling data, a popularity score based on requests from firewalls/security devices and a number of requests per firewall/security device, in which the spider can crawl up to a predetermined number of pages, number of usable bytes, number of usable for each entry point, and/or based on other criteria). In some embodiments, a selection algorithm is implemented that provides a capability for the crawler to crawl the more popular web pages with the higher probability under the particular domain (e.g., based on progressive crawling with clustering that includes associating a popularity score with the domain using various techniques described herein). In particular, as shown, the crawler feed for web domains 104 identifies web domains and/or portions of web domains (e.g., Web Domain A 120, Web Domain B 122, and Web Domain C 124, and/or other web domains available on the Internet 130) for crawling using the various techniques described herein and provides the crawler feed to a crawler 106. The crawler 106 feeds extracted contents to the clusterizer 108 when the crawling for a particular domain has completed.

In some embodiments, a popularity score for URLs generally refers to a number of firewalls and number of requests per firewall associated with the URL. In some embodiments, a popularity score is calculated using weights (e.g., firewalls for certain customers can be given greater weights, such as major corporate customers and/or governmental entity related customers, etc.). For example, as discussed above, the popularity score can be used to determine which domains to crawl.

For example, various web domains and/or portions of web domains can be selected for clustering using a clusterizer 108 using various techniques described herein. If a cluster is determined to not be mature (e.g., immature clusters are determined based on cluster size and/or various other criteria as described herein), then the unmature clusters can be identified by the clusterizer and communicated to the crawler for further growing of the cluster (e.g., crawling additional web pages in order to attempt to grow the cluster using various techniques described herein). In some embodiments, the clusterizer 108 is implemented to collect all the URLs and the content(s) of each web page that a spider has crawled for a target web domain. In some embodiments, the clusterizer 108 then classifies each web page collected. For example, for all predefined categories, the clusterizer 108 can compute a probability that a given web page, and as a result it's URL, belong to such a category. At this point, each web page can be represented by its URL having one of more likely probable categories associated with it. For example, host1.foobar.com/dir1/pageA.html can have a most probable category equal to category X, host1.foobar.com/dir2/pageB.html can have a most probable category equal to category Y, host1.foobar.com/dir1/pageC.html can have a most probable category equal to category X, and so forth. In some embodiments, the clusterizer 108 identifies clusters of pages having the same most probable category, and for each cluster determines the longest common path. In the above example, the clusterizer identifies two potential clusters: host1.foobar.com/dir1/* for category X, and host1.foobar.com/dir2/* for category Y.

In some embodiments, a cluster is considered completed or "mature" when a predefined number of pages in the clusters sharing a common URL and having the same most probable category have been determined. A non-completed cluster (e.g., or immature cluster) is considered a potential or not mature cluster. The above process can be repeated to classify a particular web domain and to further classify various other web domains. For each iteration, the clusterizer 108 collects and identifies clusters until, for example, all clusters are mature (e.g., which means a set of web pages will be assigned with a common category), no more new pages have been discovered, and/or the max parameters are reached for crawling (e.g., based on a number of pages, amount of data, and/or other parameters). As shown, mature clusters are identified by the clusterizer 108 and communicated to a publisher 110 (e.g., including a distance measure between such clusters using various techniques described herein).

In some embodiments, the publisher 110 determines whether to promote or demote a cluster as a category cluster using various techniques described herein. As shown, the publisher 110 then communicates the promoted and/or demoted category clusters to a URL categorization database 112. In some embodiments, the publisher 110 is implemented to generate a URL categorization data database 112 with, for example, a set of category clusters (e.g., the fewest numbers of category clusters, with the greatest coverage for each web domain, and with the most accurate categorization). In some embodiments, the publisher 110 implements an analysis algorithm that analyzes the clustered result based on the categories and confidence level associated with each of the clusters to determine whether to promote a mature cluster to its largest potential coverage, to reform an immature cluster, and/or to perform various other actions based on the category clustering results as described herein. For example, the publisher 110 can be configured to promote each matured cluster to its greatest potential coverage. The publisher also re-groups the non-mature clusters and analyzes the common URL based on a distance algorithm (e.g., clusters are determined based on the distance(s) between the web pages, using a distance algorithm(s), such as K-Means clustering algorithm, and/or Hierarchical clustering algorithm). For example, if the re-grouping of the un-matured clusters can qualify for a new cluster, then the reformed cluster can be used for the final publishing result.

In some embodiments, the published category clusters are stored in a data store, such as a URL categorization data database 112. For example, the clusters can be stored in a database (e.g., such as a commercially available relational database, such as a Mango® database, or another type of database).

Figure 2:
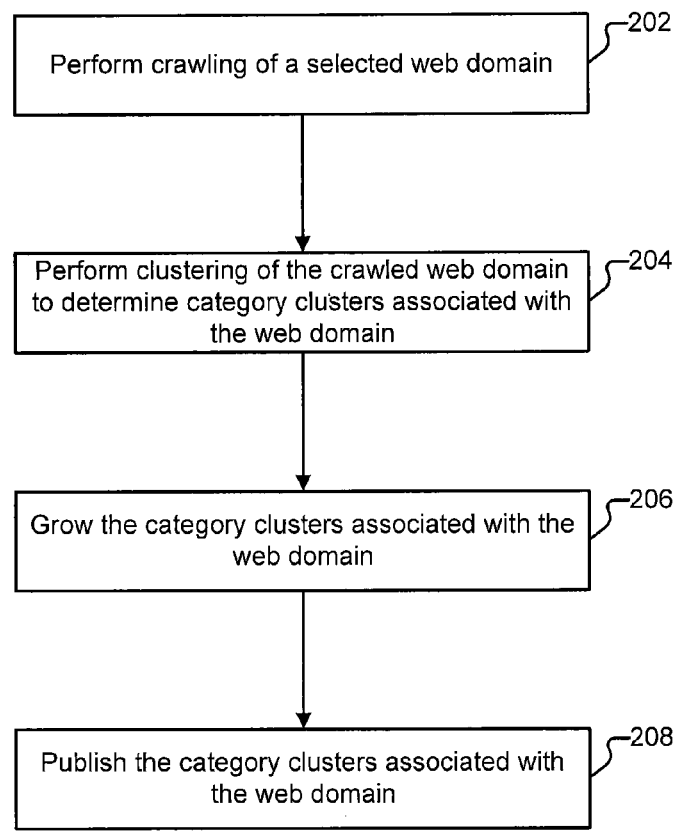
FIG. 2 is a flow diagram for providing optimized web domains classification based on progressive crawling with clustering in accordance with some embodiments.

FIG. 2 is a flow diagram for providing optimized web domains classification based on progressive crawling with clustering in accordance with some embodiments. As similarly discussed above with respect to FIG. 1, a crawler retrieves pages from a web site and extract useful information from such pages. A knowledge base about web domains can be provided that includes a listing of known hostnames and URLs for web domains. A clusterizer can be implemented, such as similarly described above with respect to FIG. 1, to classify a page into one category out of, for example, N possible categories. Also, a publisher can be implemented, such as similarly described above with respect to FIG. 1, to harvest the data generate by the clusterizer and generate a list of URLs and associated categories, which can be used, for example, as a URL data set used in URL filtering (e.g., by a firewall or other security or content filtering device or filtering software executed on a computing device or appliance).

As an example, assume that a web domain of foo.com is to be classified and also assume that the knowledge base already includes some URLs related to foo.com (e.g., such as a.foo.com, b.foo.com, c.fooc.com, . . . , and x.foo.com), such as from link harvested while previously crawling other domains, from data harvested from public sources, and/or from data mining of traffic logs from customers using URL filtering. The process shown in FIG. 2 begins with by performing initial crawling of a selected web domain at 202. In some embodiments, the crawler extracts at random URLs for the domain foo.com from the knowledge base, and then the crawler (e.g., spider or other web based crawler) crawls the corresponding web pages. For example, the crawler can read a predefined minimum number of pages for each different hostname present in the knowledge base (e.g., N>5). From each page, the crawler can collect outgoing links to other foo.com pages and add them to the list of URLs related to foo.com. The crawler can also add to the knowledge base links pointing to other web domains. The crawler can continue to read pages at random from the URLs related to foo.com until the crawler reaches a predefined limit of N pages (e.g., N=100) or a predetermined amount of crawled data, such as X KB (e.g., X=50 KB) of usable data (e.g., text based data), and/or whichever limit is reached first. For example, usable data can include text rendered (e.g., JavaScript and other client side code is executed and the resulting text extracted), parsed, and noise can be removed. In some embodiments, the data is parsed using Natural Language Processing (NLP) tools and/or n-gram based tools. For example, web pages can be classified based on textual analysis, ads/types of ads/who is serving ads, structure of html pages (e.g., blogs, shopping sites with shopping cart(s)), forward/backward links, and/or other well-known techniques can be used to classify the web page to map each web page to a category (e.g., using machine learning techniques, such as Bayes classifier and/or Bayes verifications, and/or other well-known techniques).

As similarly discussed above, the crawling process can include crawling at a domain level (e.g., Facebook.com is a social site), at host level (e.g., mail.google.com is a mail site), at path level (e.g., www.linkedin.com/jobs is a job search site, such that linkedin.com/jobs=job search), and so forth. For example, such techniques can be used to efficiently crawl and classify a large number of web domains (e.g., 100 million or more web domains). Unlike a search engine crawler that needs to crawl and index all the pages (e.g., using brute force crawling techniques), the techniques described herein can be efficiently used for crawling to properly categorize domains/hosts/path levels, but such proper categorization does not necessarily require crawling every page and indexing every page (e.g., www.facebook.com/User Name is just part of a social site, so such a page typically would not have to be independently categorized).

In some embodiments, a crawler (e.g., a particular crawler) examines a selected web domain to exhaust analysis of the web domain. For example, a spider can be used to crawl pages on a domain (e.g., randomly) until a maximum configured number of pages have been crawled or until the crawler exhausts crawlable domain based on crawling criteria. As similarly discussed above, a predetermined threshold amount of web page data can be required before attempting to cluster the domain with a sufficient level of confidence to publish the cluster. Accordingly, using these approaches, a minimum number of pages can be crawled to classify the selected web domain(s).

In some embodiments, third party lists of domains can also be mined for categorization. In some embodiments, web requests and/or logs that include lists of domains can also be mined for categorization. In some embodiments, DNS logs can be mined for categorization. Various other techniques can be used to enhance the universe of domains for classification user the various classification and categorization techniques described herein.

At 204, initial clustering of the crawled web domain to determine category clusters associated with the web domain is performed. In some embodiments, the clusterizer applies a machine learning based classification engine to classify each URL/page crawled: each page is classified in up to N categories (e.g., N=3), to determine the most likely category for each page. The clusterizer then groups pages with the same category into "clusters" and identifies the longest common paths of each cluster. For example, afoo.com/<pages> can be classified as category-1, cloo.com/<pages> can be classified as category-2, and c.foo.com/jobs/<pages> can be classified as category-3.

At 206, growing the category clusters associated with the web domain is performed. In some embodiments, growing the category clusters associated with the web domain includes the following: for each cluster, the crawler attempts to find more pages under the cluster's path (e.g., find more pages under aloo.com/<pages>, intelligently selecting pages to crawl and classify, and then repeat, to verify cluster classification for a domain, path, host, etc.). For example, growing the clusters can intelligently grow a cluster for the linkedin.com domain. Based on the growing of this cluster, the linkedin.com domain can be promoted to a social site cluster, except for linkedin.com/jobs which can be classified as a jobs site. As another example, DNS who can be used to find all servers, for example, hosting linkedin.com, and so forth. If pages are not found, then an element of the path (e.g., a directory or part of the host name) can be dropped, and additional crawling is attempted. In some embodiments, when growing a cluster, re-clustering can also be performed based on new content collected since a prior clustering process was performed. The new pages can generate new clusters using the various techniques described above. As similarly discussed above, cluster growing process can stop when all clusters are mature as described herein, when there are no new pages within a common path of non-mature clusters to crawl, and/or when a maximum number of pages or data for the web domain has already been crawled. For example, the crawling can be capped at a maximum number of pages (e.g., 1,000 web pages).

In some embodiments, after completing the growing the category clusters process, the non-mature clusters are handled as follows. The web pages in these non-mature clusters are grouped together to form a new cluster. If this re-grouped cluster is determined to satisfy the mature rule (e.g., includes a number of web pages greater than a minimum requirement for a mature cluster); or if the web pages in this re-grouped cluster shares a common path that is unique (e.g., if it is a common path that is already published by other mature clusters, then this re-group cluster can be ignored as it is not unique); or a majority of the webpages are voting for one category, then the re-grouped cluster is tagged with a path and classified with a category (e.g., categorizing this newly formed cluster with most common category across all the pages in the cluster) using techniques similarly described above.

At 208, publishing the category clusters associated with the web domain is performed. For each cluster that is determined using the above described process, the cluster's path and the associated categories (e.g., category clusters, such as three prioritized categorizations) are published. For example, for a web domain of Foo.com=category-H, category-L, category-M can be published; for a path of a.foo.com=category-A, category-B, category-C can be published; for a path of c.foo.com=category-B, category-D, category-F can be published; and for a path of c.foo.com/jobs/=category-Z, category-Y, category-W can be published.

Figure 3:
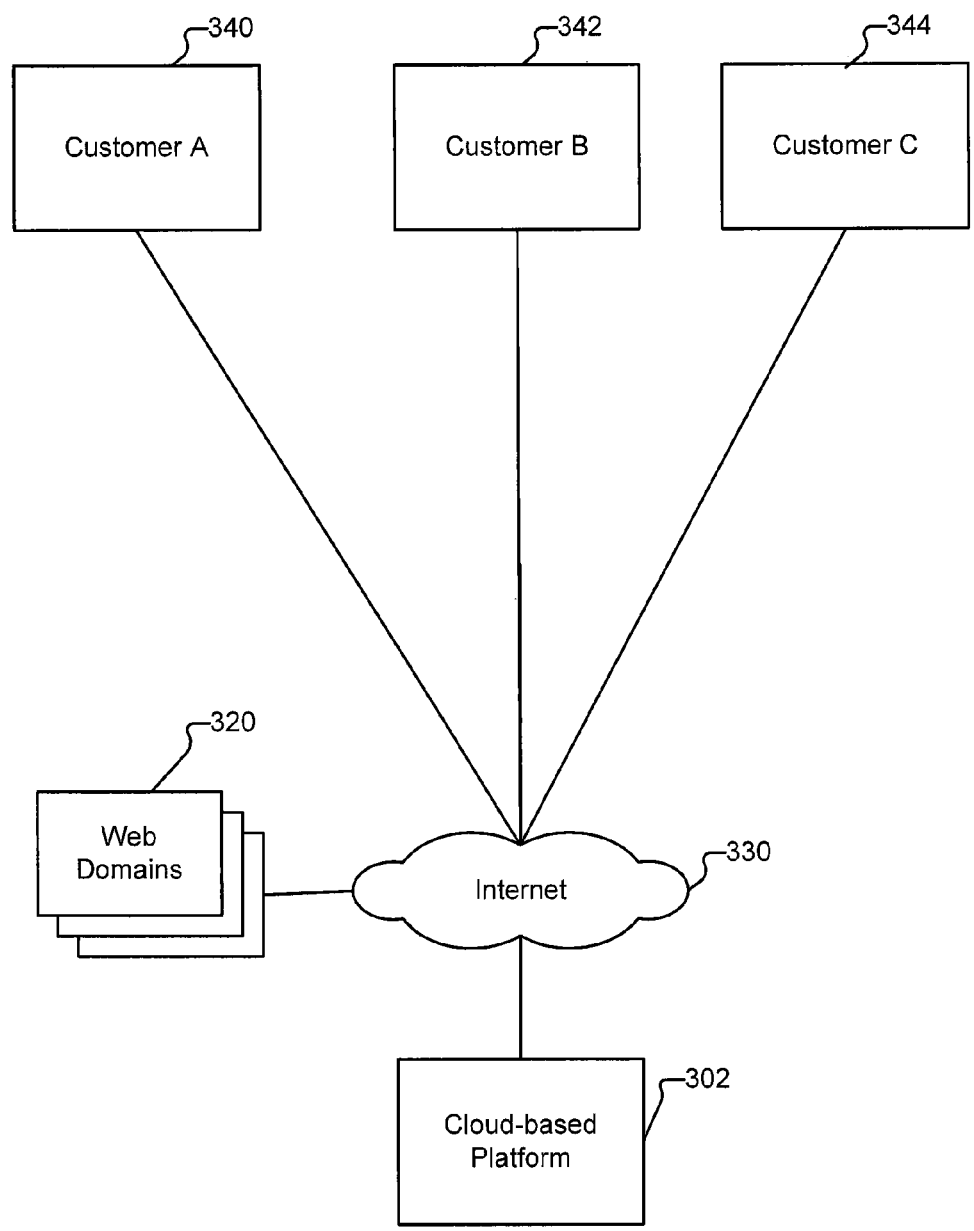
FIG. 3 is a functional diagram for an architecture for distributing optimized web domains classification based on progressive crawling with clustering for different customers in accordance with some embodiments.

FIG. 3 is a functional diagram for an architecture for distributing optimized web domains classification based on progressive crawling with clustering for different customers in accordance with some embodiments. As shown, a cloud-based platform 302 for distributing optimized web domains classification based on progressive crawling with clustering for different customers is in communication via the Internet 330 with different customers, such as Customer A 340, Customer B 342, and Customer C 344, and/or various other customers. For example, such customers can be differently situated based on geography, type of business, network security and policy requirements, and various other differences that can impact the requirements for URL categorization for such customers to classify and categorize a different set of web domains 320, as described herein.

In some embodiments, location based optimized versions of seed data for the URL categorization data (e.g., 10k-100k domains, 100m pages, and/or some other amounts of URL categorization seed data) is provided. In some embodiments, a security device (e.g., a firewall or other security device that uses URL categorization data) sends batch requests for unknown domains (e.g., hundreds to up to, for example, 1,000 batch URL requests, in which the categorization cloud service can reply for each URL and its relatives, such as for all of the children, siblings, and/or other relatives of a domain). As a result, over time, each customer's local URL categorization data store evolves to the types of URLs that their security device(s) are monitoring frequently, thereby optimizing their local data store to efficiently classify its commonly seen URLs for its network.

In some embodiments, expiration is controlled by cloud service for each URL categorization entry (e.g., 30 minutes, 1 hour, 7 hours, 24 hours, 2 days, 1 week, and/or some other time based interval or other variable based constraint). In some embodiments, newly classified domains are published with lower confidence and, thus, can be published with a shorter expiration (e.g., 30 minutes or some other interval) to monitor for feedback for follow-up queries for that domain to evolve/improve the classification and categorization of that domain, and increasing the expiration for that entry as monitored feedback improves (e.g., fewer follow-up queries related to that domain, such as number of firewalls and number of requests per firewall).

In some embodiments, techniques for providing optimized web domains classification based on progressive crawling are implemented as a cloud service (e.g., cloud-based platform 302), such as similarly described above with respect to FIG. 1, that provides URL categorization to security devices and/or security hardware/software solutions, such as enterprise firewalls, integrated security solutions that provide content filtering, including network device based (e.g., security appliance, router, gateway, and/or other network devices), host security software, and client security software related solutions at various customer networks (e.g., for Customer A 340, Customer B 342, and Customer C 344, and/or various other customers). In some embodiments, a cloud service (e.g., cloud-based platform 302) for providing optimized web domains classification based on progressive crawling with clustering includes distributing a first URL content categorization data feed to a first plurality of subscribers (e.g., including Customer A 340), in which the first URL content categorization data feed is collected using an optimized web domains classification based on progressive crawling with clustering to determine which category clusters to publish for each categorized web domain; and distributing a second URL content categorization data feed to a second plurality of subscribers (e.g., including Customer B 342), in which the second URL content categorization data feed is collected using an optimized web domains classification based on progressive crawling with clustering to determine which category clusters to publish for each categorized web domain. In some embodiments, the first plurality of subscribers are associated with a first geography and/or language, and the second plurality of subscribers are associated with a second geography and/or language. For example, such a cloud service can provide a URL categorization seed database by region (e.g., Latin America, Asia, Europe, Americas, etc.).

In some embodiments, the cloud service (e.g., cloud-based platform 302) can also batch requests from one or more security devices for unknown URL requests for processing by a URL classifier; receive in return the determined URL classifications (e.g., including all of the relatives, such as parents and siblings, etc.); and then send the updated/new URL classifications to the requesting security devices, which can cache or store the updated/new URL classifications. As a result, over time, the URL classifications data can be optimized for each customer (e.g., as a United States based bank customer's security devices will typically intercept different domain content requests than would a United States based law firm customer's security devices).

In some embodiments, the cloud service (e.g., cloud-based platform 302) for providing optimized web domains classification based on progressive crawling with clustering further includes receiving a request to classify content for a first web domain from a first security device (e.g., a firewall/security device, such as an integrated security appliance that performs URL filtering and/or other firewall related functions that apply security policies based on URL categorization data, such as a first security device at a customer network of a Customer A 340); automatically classifying the content for the first web domain; sending the classification for the content for the first web domain to the first security device; receiving a request to classify content for a second web domain from a second security device (e.g., such as a second security device at a customer network of a Customer B 342); automatically classifying the content for the second web domain; and sending the classification for the content for the second web domain to the second security device. For example, using such techniques, the first security device can store different URL categorization data sets over time than the second security device (e.g., even if the initial URL categorization data sets provided to each security device were identical) based on different URL requests passing through first security device over time that would trigger different new URL content categorization requests being sent to and then received from the cloud service, in which the URL categorization data sets stored on the first security device are thereby optimized for the first security device.

Figure 4:
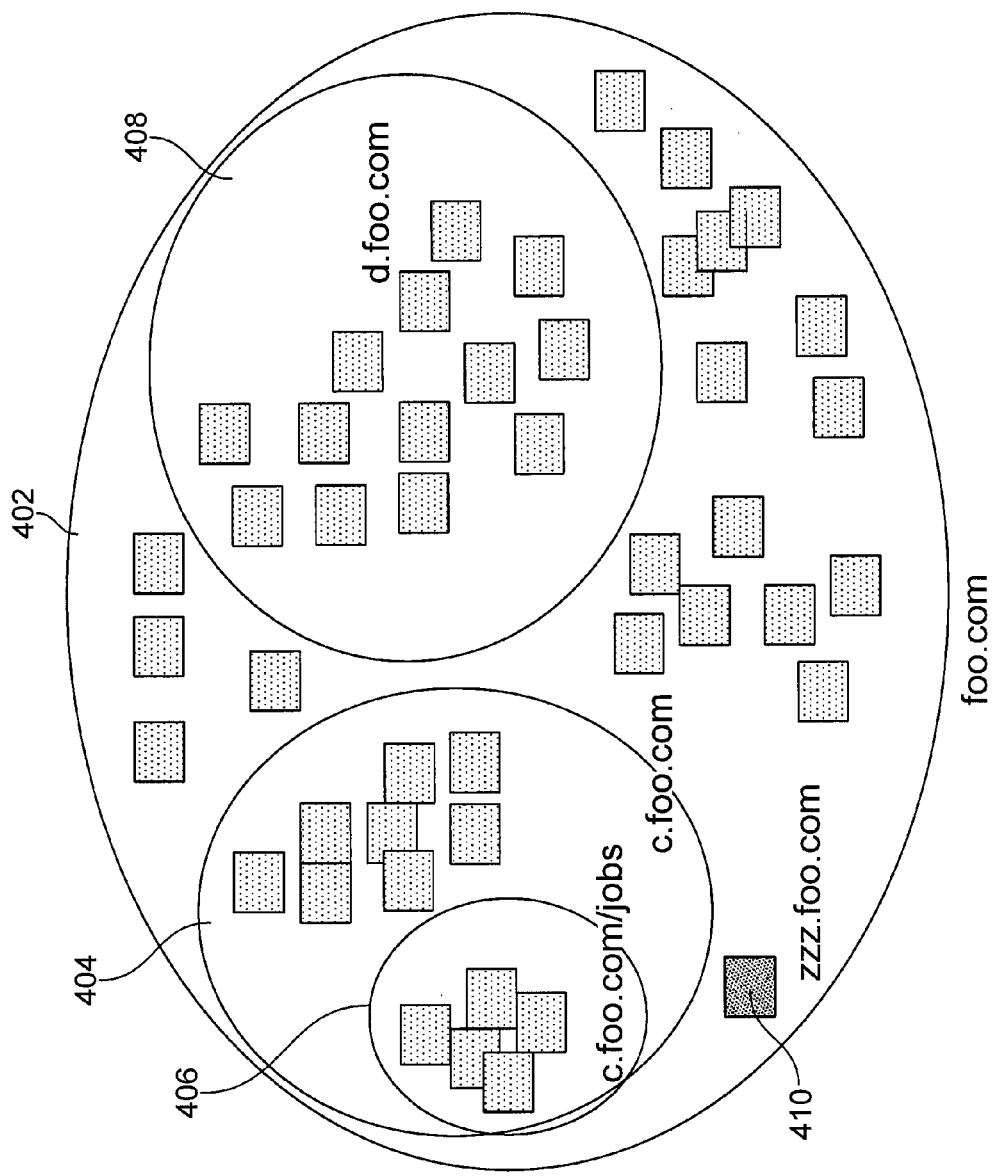
FIG. 4 is a functional diagram illustrating a set of category clusters determined for optimized web domains classification based on progressive crawling with clustering in some embodiments.

FIG. 4 is a functional diagram illustrating a set of category clusters determined for optimized web domains classification based on progressive crawling with clustering. As shown, FIG. 4 illustrates a set of category clusters for a web domain of foo.com (402), that includes a cluster for d.foo.com (408), a cluster for c.foo.com (404), and a cluster for c.foo.com/jobs (406). However, as shown, there is to cluster provided for zzz.foo.com (410) for this web domain, as provided in a first URL categorization data set for foo.com.

For example, after a URL data set (e.g., URL categorization data store 112 as shown in FIG. 1 and discussed above with respect to FIG. 1) is deployed, then data from customer traffic can be analyzed based on monitored web domain traffic requests, such as discussed above (e.g., as similarly described above with respect to FIG. 3). As a result, new hostnames that are identified can be added into the knowledge base. A high number of request to a particular hostname not previously crawled (e.g., zzz.foo.com) can trigger an automatic request for re-categorization of the domain (e.g., foo.com). The process is then repeated as similarly described above using the knowledge base that now has information about zzz.foo.com. As a result, over time the overall process of re-clustering, which generally includes, as described herein, crawling, classifying, publishing, and monitoring converges as no new hostnames are discovered. For example, if the Google domain was clustered a first time, but then a customer queries for google.com/news and it is determined that a re-clustering is required to include the google.com/news portion of that domain which was missed in a first clustering of that web domain, and that can yield a new cluster categorized as news for that portion of that domain.

Figure 5:
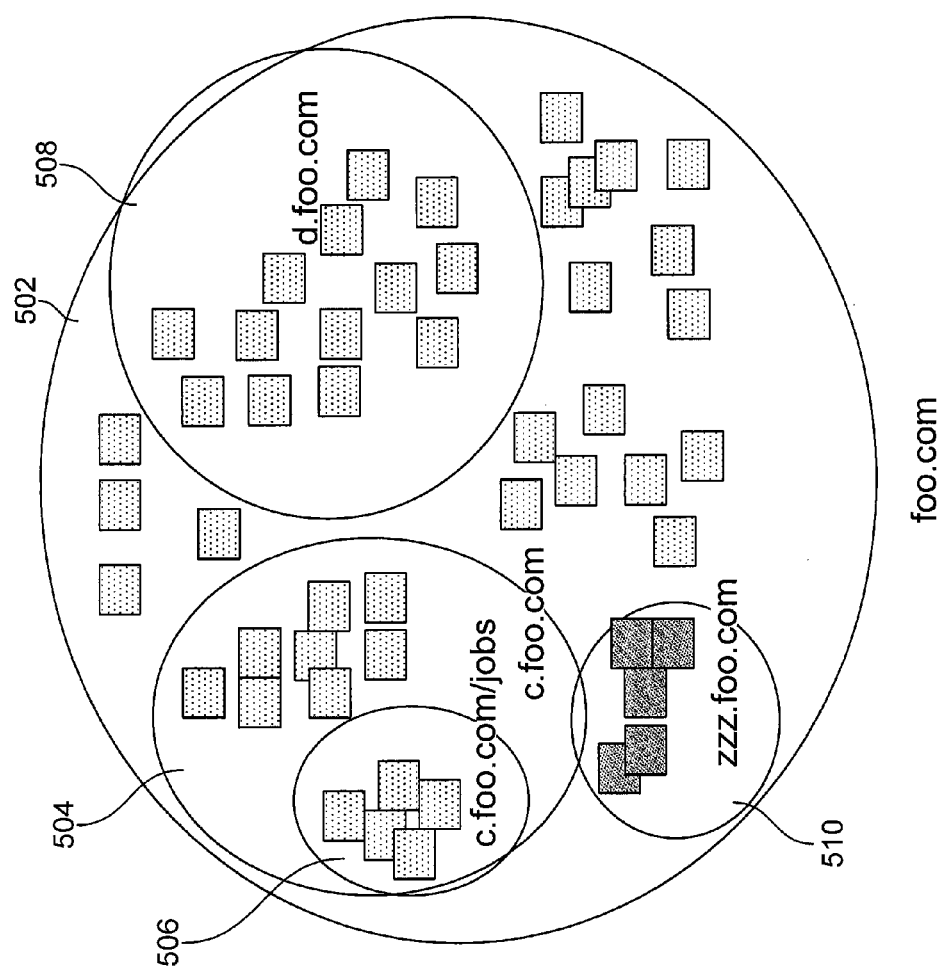
FIG. 5 is a functional diagram illustrating another set of category clusters determined for optimized web domains classification based on progressive crawling with clustering in some embodiments.

FIG. 5 is a functional diagram illustrating another set of category clusters determined for optimized web domains classification based on progressive crawling with clustering. As shown, FIG. 5 illustrates a set of category clusters for a web domain of foo.com (502) after a re-clustering is performed for foo.com. The re-clustered data set as shown includes a cluster for d.foo.com (508), a cluster for c.foo.com (504), and a cluster for c.foo.com/jobs (506), and as also shown, after re-clustering, also includes a cluster for zzz.foo.com (510) for this web domain, as provided in a second URL categorization data set for foo.com.

Figure 6:
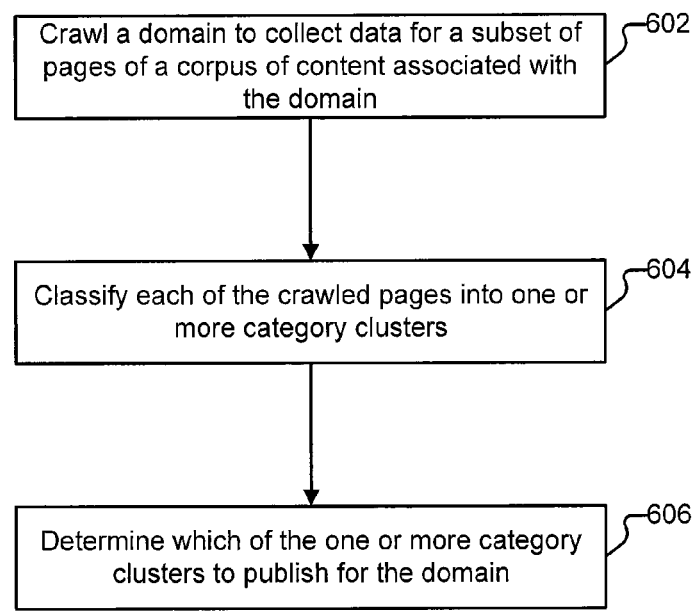
FIG. 6 is another flow diagram for providing optimized web domains classification based on progressive crawling with clustering in accordance with some embodiments.

FIG. 6 is another flow diagram for providing optimized web domains classification based on progressive crawling with clustering in accordance with some embodiments. At 602, crawling a domain (e.g., a web site domain) is performed to collect data for a subset of pages (e.g., web pages) of a corpus of content associated with the domain. At 604, classifying each of the crawled pages into one or more category clusters is performed, in which the category clusters represent a content categorization of the corpus of content associated with the domain (e.g., a URL content categorization for the domain, host of that domain, and/or directory of that domain). At 606, determining which of the one or more category clusters to publish for the domain is determined.

Figure 7:
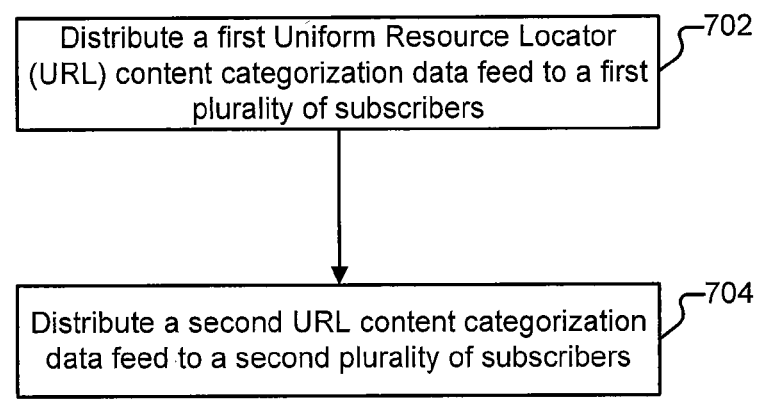
FIG. 7 is another flow diagram for providing optimized web domains classification based on progressive crawling with clustering in accordance with some embodiments.
Figure 8:
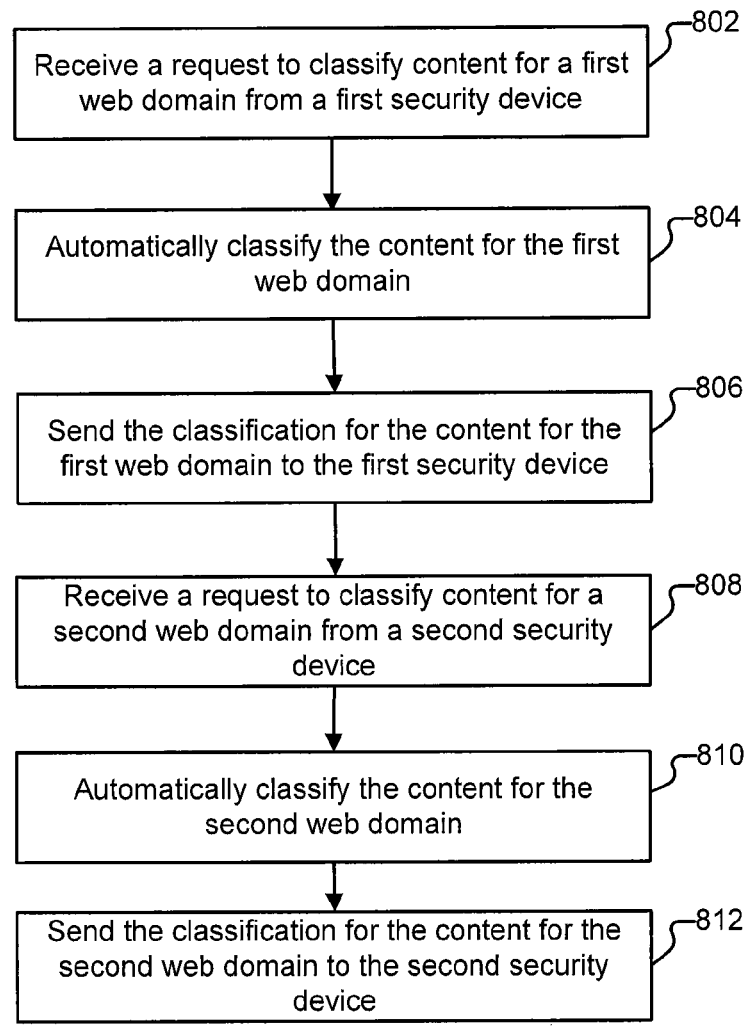
FIG. 8 is another flow diagram for providing optimized web domains classification based on progressive crawling with clustering in accordance with some embodiments.

FIG. 7 is another flow diagram for providing optimized web domains classification based on progressive crawling with clustering in accordance with some embodiments. At 702, distribute a first Uniform Resource Locator (URL) content categorization data feed to a first plurality of subscribers, in which the first URL content categorization data feed is collected using an optimized web domains classification based on progressive crawling with clustering to determine which category clusters to publish for each categorized web domain. At 804, distribute a second URL content categorization data feed to a second plurality of subscribers, in which the second URL content categorization data feed is collected using an optimized web domains classification based on progressive crawling with clustering to determine which category clusters to publish for each categorized web domain FIG. 8 is another flow diagram for providing optimized web domains classification based on progressive crawling with clustering in accordance with some embodiments. At 802, a request is received to classify content for a first web domain from a first security device. At 804, automatically classifying the content for the first web domain is performed. At 806, the classification is sent for the content for the first web domain to the first security device. At 808, a request is received to classify content for a second web domain from a second security device. At 810, automatically classifying the content for the second web domain is performed. At 812, the classification is sent for the content for the second web domain to the second security device. Accordingly, using such techniques described above, the first security device can store different URL categorization data than the second security device based on different URL requests passing through first security device.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for optimized web domains classification based on progressive crawling with clustering, comprising:
a processor configured to:
crawl a domain to collect data for a subset of pages of a corpus of content associated with the domain;
classify each of the crawled pages into one or more category clusters, wherein the category clusters represent a content categorization of the corpus of content associated with the domain, and wherein the classifying of the each of the crawled pages into the one or more category clusters comprises:
determine a category for the each of the crawled pages in the domain;
group more than one page having the same category into a first cluster;
determine whether a number of the more than one page of the first cluster exceeds a first threshold; and
in the event that the number of the more than one page of the first cluster does not exceed the first threshold, select a new page within the domain to crawl and classify; and
determine which of the one or more category clusters to publish for the domain; and
a memory coupled to the processor and configured to provide the processor with instructions.

2. The system recited in claim 1, wherein the processor is further configured to:
determine a sub-entry point to randomly select as a next web page to crawl of the subset of web pages.

3. The system recited in claim 1, wherein classifying each of the crawled pages into one or more category clusters includes associating each of the crawled pages with a Uniform Resource Locator (URL) content categorization.

4. The system recited in claim 1, wherein the processor is further configured to:
promote a cluster to a primary category cluster for the domain.

5. The system recited in claim 1, wherein the processor is further configured to:
demote a primary category cluster to a secondary category cluster for the domain.

6. The system recited in claim 1, wherein the processor is further configured to:
determine which of the one or more category clusters to promote into a primary category cluster or a secondary category cluster, or to demote.

7. The system recited in claim 1, wherein the processor is further configured to:
determine which of the one or more category clusters to promote into a primary category cluster or a secondary category cluster, or to demote using one or more heuristics to determine a confidence level.

8. The system recited in claim 1, wherein the processor is further configured to:
determine which of the one or more category clusters to promote into a primary category cluster or a secondary category cluster, or to demote using one or more heuristics to determine a confidence level, including using a rate of cluster size growth.

9. The system recited in claim 1, wherein the processor is further configured to:
perform domain classification at a domain level, a host level, and/or a path level.

10. The system recited in claim 1, wherein the processor is further configured to:
classify content based on requests for content received from one or more of a plurality of security devices.

11. The system recited in claim 1, further comprising:
in the event that the number of the more than one page of the first cluster exceeds the first threshold, identifying a second cluster in the domain based on pages not related to the first cluster, wherein the second cluster includes a number of pages exceeding a second threshold, the second threshold being less than the first threshold.

12. A method of optimized web domains classification based on progressive crawling with clustering, comprising:
crawling a domain to collect data for a subset of pages of a corpus of content associated with the domain;
classifying each of the crawled pages into one or more category clusters, wherein the category clusters represent a content categorization of the corpus of content associated with the domain, and wherein the classifying of the each of the crawled pages into the one or more category clusters comprises:
determining a category for the each of the crawled pages in the domain;
grouping more than one page having the same category into a first cluster;
determining whether a number of the more than one page of the first cluster exceeds a first threshold; and
in the event that the number of the more than one page of the first cluster does not exceed the first threshold, selecting a new page within the domain to crawl and classify; and
determining which of the one or more category clusters to publish for the domain.

13. The method of claim 12, further comprising:
determining a sub-entry point to randomly select as a next web page to crawl of the subset of web pages.

14. The method of claim 12, wherein classifying each of the crawled pages into one or more category clusters includes associating each of the crawled pages with a Uniform Resource Locator (URL) content categorization.

15. The method of claim 12, further comprising:
determining which of the one or more category clusters to promote into a primary category cluster or a secondary category cluster, or to demote.

16. The method of claim 12, further comprising:
classifying content based on requests for content received from one or more of a plurality of security devices.

17. A computer program product for optimized web domains classification based on progressive crawling with clustering, the computer program product being embodied in a tangible non-transitory computer readable storage medium and comprising computer instructions for:
crawling a domain to collect data for a subset of pages of a corpus of content associated with the domain;
classifying each of the crawled pages into one or more category clusters, wherein the category clusters represent a content categorization of the corpus of content associated with the domain, and wherein the classifying of the each of the crawled pages into the one or more category clusters comprises:
determining a category for the each of the crawled pages in the domain;
grouping more than one page having the same category into a first cluster;
determining whether a number of the more than one page of the first cluster exceeds a first threshold; and
in the event that the number of the more than one page of the first cluster does not exceed the first threshold, selecting a new page within the domain to crawl and classify; and
determining which of the one or more category clusters to publish for the domain.

18. The computer program product recited in claim 17, further comprising computer instructions for:
determining a sub-entry point to randomly select as a next web page to crawl of the subset of web pages.

19. The computer program product recited in claim 17, wherein classifying each of the crawled pages into one or more category clusters includes associating each of the crawled pages with a Uniform Resource Locator (URL) content categorization.

20. The computer program product recited in claim 17, further comprising computer instructions for:
determining which of the one or more category clusters to promote into a primary category cluster or a secondary category cluster, or to demote.

21. The computer program product recited in claim 17, further comprising computer instructions for:
classifying content based on requests for content received from one or more of a plurality of security devices.

22. A system that implements a cloud service for providing optimized web domains classification based on progressive crawling with clustering, comprising:
a processor configured to:
distribute a first Uniform Resource Locator (URL) content categorization data feed to a first plurality of subscribers, wherein the first URL content categorization data feed is collected using an optimized web domains classification based on progressive crawling with clustering to determine which category clusters to publish for each categorized web domain, and wherein the distributing of the first Uniform Resource Locator (URL) content categorization data feed to the first plurality of subscribers comprises:
receive a request to classify content for a first web domain from a first security device;
automatically classify the content for the first web domain, comprising:
crawl a plurality of pages in the first web domain;
determine a category for the plurality of pages in the first web domain;
group more than one page having the same category into a first cluster;
determine whether a number of the more than one page of the first cluster exceeds a first threshold; and
in the event that the number of the more than one page of the first cluster does not exceed the first threshold, select a new page within the domain to crawl and classify; and
send the classification for the content for the first web domain to the first security device; and
distribute a second URL content categorization data feed to a second plurality of subscribers, wherein the second URL content categorization data feed is collected using an optimized web domains classification based on progressive crawling with clustering to determine which category clusters to publish for each categorized web domain; and
a memory coupled to the processor and configured to provide the processor with instructions.

23. The system recited in claim 22, wherein the first plurality of subscribers are associated with a first geography and/or language, and wherein the second plurality of subscribers are associated with a second geography and/or language.

24. The system recited in claim 22, wherein the processor is further configured to:
   receive a request to classify content for a second web domain from a second security device;
   automatically classify the content for the second web domain; and
   send the classification for the content for the second web domain to the second security device.

25. The system recited in claim 22, wherein the processor is further configured to:
   receive a request to classify content for a second web domain from a second security device;
   automatically classify the content for the second web domain; and
   send the classification for the content for the second web domain to the second security device;
   wherein the first security device stores different URL categorization data than the second security device based on different URL requests passing through first security device.

* * * * *